US008495553B2

(12) United States Patent
Antony et al.

(10) Patent No.: US 8,495,553 B2
(45) Date of Patent: Jul. 23, 2013

(54) NATIVE THRESHOLD VOLTAGE SWITCHING

(75) Inventors: George Antony, Cochin (IN); Sridhar H. Rangarajan, Bangalore (IN); Alexander J. Suess, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/315,406

(22) Filed: Dec. 9, 2011

(65) Prior Publication Data

US 2013/0152028 A1    Jun. 13, 2013

(51) Int. Cl.
  *G06F 17/50* (2006.01)
(52) U.S. Cl.
  USPC .......................... 716/133; 716/109
(58) Field of Classification Search
  USPC .................................. 716/109, 133
  See application file for complete search history.

(56) References Cited

U.S. PATENT DOCUMENTS

| 6,928,635 | B2 | 8/2005 | Pramanik et al. | |
|---|---|---|---|---|
| 6,933,744 | B2 | 8/2005 | Das et al. | |
| 7,454,738 | B2 | 11/2008 | Bhunia et al. | |
| 7,810,053 | B2 | 10/2010 | Bushnell et al. | |
| 2003/0177460 | A1* | 9/2003 | Chen | 716/5 |
| 2005/0044515 | A1* | 2/2005 | Acar et al. | 716/5 |
| 2007/0250797 | A1* | 10/2007 | Engel et al. | 716/2 |
| 2008/0092092 | A1 | 4/2008 | Dalton et al. | |
| 2008/0178128 | A1 | 7/2008 | de Dood et al. | |
| 2009/0241079 | A1* | 9/2009 | Binder et al. | 716/6 |
| 2010/0083193 | A1 | 4/2010 | Mbouombouo et al. | |
| 2010/0281448 | A1 | 11/2010 | He | |

OTHER PUBLICATIONS

Anonymous, Method and Apparatus for Mode Dependent- Static Signal Probability based leakage power optimization by converting low-vt cells to high-vt cells. IPCOM000159895D, IP.com Prior Art Database.
Anonymous, Method for a complimentary device CMOS circuit design, IPCOM000006377D, IP.com Prior Art Database.

* cited by examiner

*Primary Examiner* — Vuthe Siek
(74) *Attorney, Agent, or Firm* — Richard M. Kotulak; Hoffman Warnick LLC

(57) ABSTRACT

A computer-implemented method of determining threshold voltage levels within a macro of integrated circuit cells. In one embodiment, the method includes: referencing a library of the integrated circuit cells in the macro; estimating a leakage power and a dynamic power for a first integrated circuit cell in the macro; comparing the leakage power with the dynamic power; switching the first integrated circuit cell to a low threshold voltage level in response to determining the dynamic power is greater than the leakage power; and updating the library with a voltage level of the first integrated circuit cell.

20 Claims, 2 Drawing Sheets

NATIVE THRESHOLD VOLTAGE SWITCHING

FIELD OF THE INVENTION

The subject matter disclosed herein relates to solutions for dynamically switching native threshold voltages in an integrated circuit. More specifically, the subject matter disclosed herein relates to solutions for dynamically switching native threshold voltages in an integrated circuit based upon early power estimates obtained during logic synthesis.

BACKGROUND

As high performance integrated circuits (e.g., very large scale integration, VLSI circuits) advance, the power consumed by these circuits is of greater concern. Power consumption was addressed during the logic synthesis of previous technology nodes by tuning the threshold voltage (Vt) of each cell in the circuit to a desired frequency, and using high-cost cooling systems to regulate the heat generated by the circuitry including those cells. However, as these VLSI devices advance, they reduce in size, thereby increasing their power dissipation per square unit, which contributes to overheating.

Multi-threshold voltage (Multi-Vt) library cells have been implemented in the logic synthesis process to address both performance and power consumption. These Multi-Vt library cells can be set at different threshold voltage levels, e.g., level 1 (vt1), level 2 (vt2), or level 3 (vt3). Traditionally, circuit models have been designed to limit the percentage of Multi-Vt cells operating at low Vt (e.g., vt1), as these low Vt cells draw more leakage power than the other Vt cells (e.g., vt2 or vt3). Additionally, this conventional approach has included switching all non-critical gates to higher Vt levels (e.g., vt3) to further reduce leakage power.

This focus on leakage power still fails to adequately account for the heat dissipated by each cell, and may still produce a circuit prone to overheating. This leakage power-focused approach also does not account for other power contribution factors like dynamic power and glitch power.

BRIEF SUMMARY

A computer-implemented method of determining threshold voltage levels within a macro of integrated circuit cells is disclosed. In one embodiment, the method includes: referencing a library of the integrated circuit cells in the macro; estimating a leakage power and a dynamic power for a first integrated circuit cell in the macro; comparing the leakage power with the dynamic power; switching the first integrated circuit cell to a low threshold voltage level in response to determining the dynamic power is greater than the leakage power; and updating the library with a voltage level of the first integrated circuit cell.

A first aspect includes a computer-implemented method of determining threshold voltage levels within a macro of integrated circuit cells, the method including: referencing a library of the integrated circuit cells in the macro; estimating a leakage power and a dynamic power for a first integrated circuit cell in the macro; comparing the leakage power with the dynamic power; switching the first integrated circuit cell to a low threshold voltage level in response to determining the dynamic power is greater than the leakage power; and updating the library with a voltage level of the first integrated circuit cell A second aspect includes a system having: at least one computing device for determining threshold voltage levels within a macro of integrated circuit cells by performing actions including: referencing a library of the integrated circuit cells in the macro; estimating a leakage power and a dynamic power for a first integrated circuit cell in the macro; comparing the leakage power with the dynamic power; switching the first integrated circuit cell to a low threshold voltage level in response to determining the dynamic power is greater than the leakage power; and updating the library with a voltage level of the first integrated circuit cell.

A third aspect includes a computer program comprising program code embodied in at least one computer-readable storage medium, which when executed, enables a computer system to determine threshold voltage levels within a macro of integrated circuit cells by performing actions comprising: referencing a library of the integrated circuit cells in the macro; estimating a leakage power and a dynamic power for a first integrated circuit cell in the macro; comparing the leakage power with the dynamic power; switching the first integrated circuit cell to a low threshold voltage level in response to determining the dynamic power is greater than the leakage power; and updating the library with a voltage level of the first integrated circuit cell.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

Figure 1:
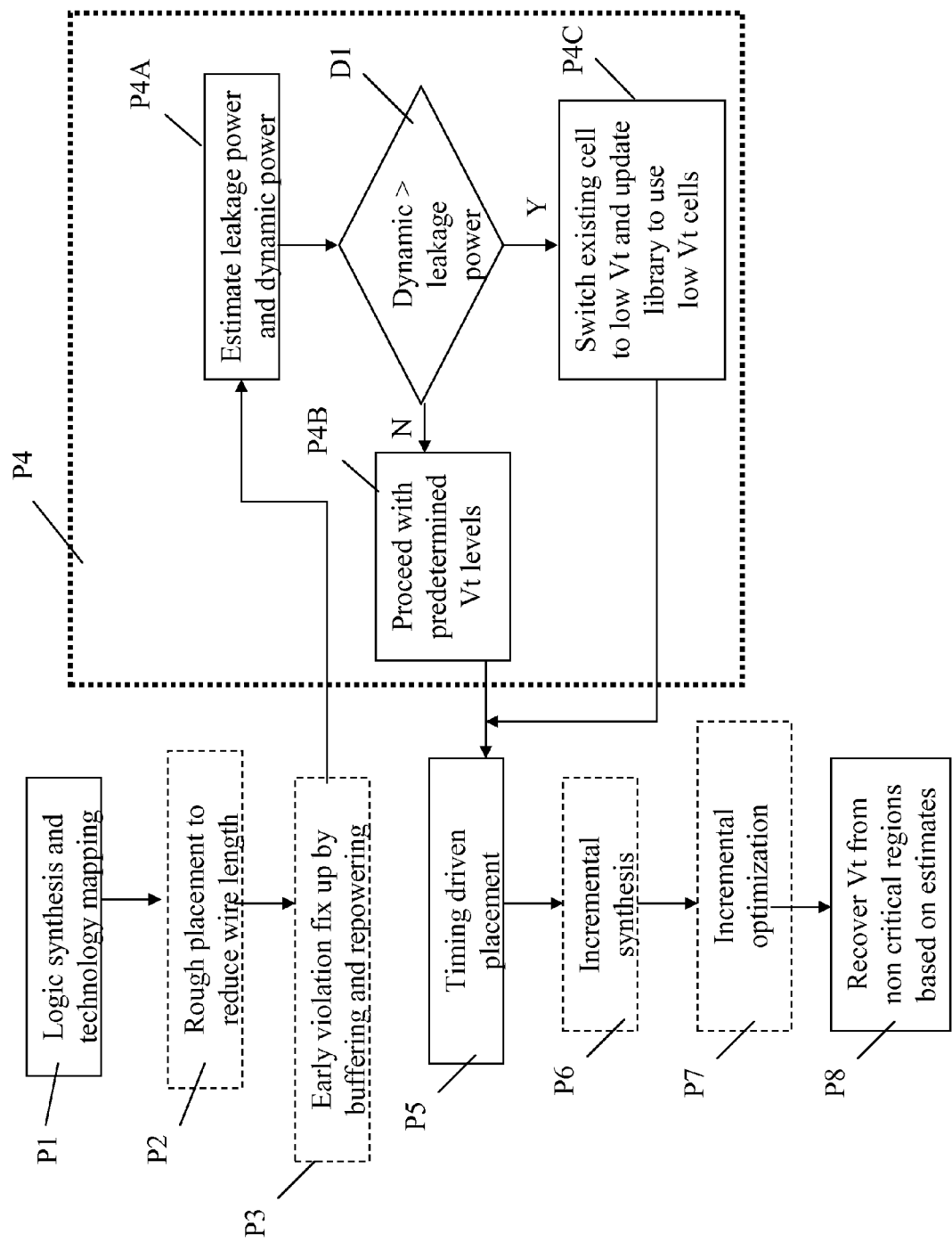
FIG. 1 shows a flow diagram illustrating processes in a method according to embodiments of the invention.

The subject matter disclosed herein relates to solutions for dynamically switching native threshold voltages in an integrated circuit. More specifically, the subject matter disclosed herein relates to solutions for dynamically switching native low power default threshold voltages in an integrated circuit based upon early power estimates obtained during logic synthesis.

As noted herein, multi-threhold voltage (Multi-Vt) library cells have been implemented in the logic synthesis process to address both performance and power consumption. These Multi-Vt library cells can be set at different low power default threshold voltage levels, e.g., level 1 (vt1), level 2 (vt2), or level 3 (vt3). Traditionally, circuit models are designed to limit the percentage of Multi-Vt cells operating at low Vt (e.g., vt1), as these low Vt cells draw more leakage power than the other Vt cells (e.g., vt2 or vt3). Additionally, this conventional approach has included switching all non-critical gates to higher Vt levels (e.g., vt3) to further reduce leakage power.

This focus on leakage power still fails to adequately account for the heat dissipated by each cell, and may still produce a circuit prone to overheating. This leakage power-focused approach also does not account for other power contribution factors such as dynamic power and glitch power.

In contrast to the conventional approaches, aspects of the disclosure provide an approach that reduces cell dynamic power consumption on dynamic power-dominated cells with a better distribution of Vt levels across cells. As is known in the art, within the same type of devices (e.g., memory devices), cells set at lower Vt levels will operate with greater speed (less delay) than those cells set at relatively higher Vt levels. By default, traditional logic synthesis tools map logic for cells (e.g., logic defined in a VHSIC hardware description language, or VHDL) to a standard (e.g., middle, or vt2) threshold voltage level.

In one embodiment, a computer-implemented method of determining threshold voltage levels (e.g., low power default threshold voltage levels) within a macro of integrated circuit cells is disclosed. In one aspect, the method includes: a) referencing a pre-generated library of the integrated circuit cells in the macro (e.g., a library including data about each of the cells in the macro, including their default threshold voltage levels); b) estimating a leakage power and a dynamic power for a first integrated circuit cell in the macro; c) comparing the leakage power with the dynamic power to determine whether one is greater than the other; d) switching the first integrated circuit cell to a low threshold voltage level in response to determining the dynamic power is greater than the leakage power (e.g., greater by some predetermined factor); and e) updating the library with a voltage level of the first integrated circuit cell, which may include changing the default threshold level of the first integrated circuit cell in the macro. It is understood that updating the library can include providing instructions to update the library to another entity managing/providing the library data.

As noted herein, the low power default threshold voltage level (Vt) of a cell has a major impact on cell timing delay and leakage power. By default, logic synthesis tools initially map logic defined in the VHSIC hardware description language (VHDL) to a standard/regular Vt, which offers a trade-off between delay and leakage power. In this conventional approach, the later optimization stage relies on multi-Vt optimizations to bind cells on critical regions to low Vt, to improve delay and recover Vt from cells on non critical regions, switching the non-critical cells to a high Vt level to reduce leakage.

The conventional approach relies heavily on the optimization phase to close timing gaps in the logic. In order to reduce that reliance on the optimization phase, aspects of the method include identifying a desirable Vt level for cells prior to the incremental synthesis and incremental optimization phases, based upon whether those cells are dynamic-power "dominated."

Turning to FIG. 1, an illustrative method flow diagram is shown according to embodiments. Preliminary process P1 includes performing a conventional logic synthesis and mapping process, including converting a circuit design (in the form of circuit design data 142 (FIG. 2), e.g., in a VHDL, or register transfer level, RTL) into a configuration of logic gates. As is known in the art, these logic gates can include devices within the circuit design that perform a logical operation on one or more inputs to produce a single output. Returning to FIG. 1, after mapping the configuration of logic gates, preliminary process P2 can include rough placement of the gates to minimize overall wirelength (between devices represented by the logic gates). Next, in preliminary process P3, early violations are addressed through a coarse optimization method, such as buffering and repowering to correct electrical violations and improve timing. Preliminary processes P2 and P3 can convert the design to a state that generally represents the final placement of logic gates in the circuit design. These preliminary processes are conventionally performed during logic Synthesis, and as such, are only briefly described herein.

Following preliminary process P3, aspects of the invention include performing an additional optimization technique, in process P4, to determine Vt levels within the macro of integrated circuit cells prior to conventional timing driven placement. Process P4 can include the following sub-processes:

Process P4A: estimating leakage power and a dynamic power levels for a first integrated circuit cell. This estimation can be performed with any conventional algorithm and/or calculation used to estimate the power levels (leakage and dynamic) of integrated circuit cells. In some cases, the calculation can be based on "crude" estimates such as fan-out and/or scale-factors for each Vt level. In other cases, the calculation can be based on more "sophisticated" pre-characterization simulations of leakage and dynamic power. In other cases, the leakage and dynamic power levels can be determined using a conventional power simulation engine.

Decision D1 (following process P4A): comparing the leakage power with the dynamic power for the first integrated circuit cell. In some cases, this decision can include determining whether the dynamic power is greater than the leakage power by a predetermined factor. The predetermined factor could be determined by a user/operator or another parameter, and can be any factor capable of indicating that a cell is dynamic power-dominated. In one case, the factor could be 3 (e.g., dynamic power dominated cells are indicated as those having a dynamic power of at least three times as great as the leakage power). As noted with respect to process P4C, in the case that the dynamic power is three times the leakage power (or more), all of the cells in the macro can be switched to a low Vt level;

Process P4B (following a No decision in decision D1): proceeding with timing driven placement using the predetermined Vt levels. In this case, where the dynamic power is not greater than the leakage power, the process continues to process P5, which includes proceeding with timing-driven placement of cells according to their previously determined Vt levels; and Process P4C (following a Yes decision in decision D1): switching the first integrated circuit cell to a low threshold voltage level in response to determining the dynamic power is greater than the leakage power, and updating the library with a voltage level of the first integrated circuit cell. In some cases, where the first integrated circuit cell has a dynamic power greater than its leakage power (e.g., by a predetermined factor), this process can include switching all of the cells in the macro to a low Vt level (or, a lowest default threshold Vt available in each cell), and updating the library with this default threshold Vt level, accordingly.

It is understood that while the processes described herein refer to actions taken with respect to a first integrated circuit cell (e.g., estimating leakage/dynamic power, comparing leakage versus dynamic power and switching voltage levels), these processes can further be performed with respect to all of the integrated circuit cells in the macro.

Following process P4B or P4C, timing-driven placement (process P5), incremental synthesis (process P6), and incremental optimization (process P7) can be performed on the macro (updated or not), according to conventional approaches. Following process P7, the method can include, in process P8, recovering "shortcomings" in Vt levels from non-critical regions, based upon the estimates made in process P4A. The process of recovering "shortcomings" includes switching one or more cells in non-critical regions to a higher default Vt levels in order to reduce the overall leakage power in the macro. That is, where Vt levels were set at lower default levels in cells within critical regions, the overall leakage power of the macro can be reduced by switching the cells in the non-critical regions to higher Vt levels to compensate for the leakage power in the low Vt default cells.

Below is a table (Table A) illustrating example results of the process according to embodiments of the invention. Table A illustrates twelve distinct designs, each run using a conventional Vt determination approach (first row), and a Vt determination approach according to embodiments of the invention. The first six design cases (Design1-Design6) represented dynamic power dominated macros (dynamic power is 3 times greater than leakage power), while the second six design cases (Design7-Design12) are not dynamic power dominated (dynamic power is less than 3 times greater than leakage).

TABLE A

| Testcase | WNS (ns) | Area utilized (%) | Leakage power (mW) | Dynamic power (mW) | Total power (mW) |
|---|---|---|---|---|---|
| Design1 | −3.840 | 65 | 17.24 | 203.07 | 220.31 |
|  | 4.701 | 52 | 17.98 | 179.30 | 197.28 |
| Design2 | 8.15 | 71 | 16.05 | 267.23 | 283.29 |
|  | 10.54 | 56 | 18.77 | 214.73 | 233.51 |
| Design3 | −4.54 | 60 | 8.39 | 89.57 | 97.97 |
|  | −2.93 | 51 | 10.23 | 77.89 | 88.12 |
| Design4 | −23.70 | 89 | 10.32 | 36.44 | 46.77 |
|  | −22.58 | 66 | 9.40 | 26.07 | 35.47 |
| Design5 | −9.43 | 52 | 1.38 | 29.67 | 31.05 |
|  | −10.25 | 48 | 1.75 | 28.48 | 30.24 |
| Design6 | −4.13 | 68 | 2.01 | 9.74 | 11.76 |
|  | 1.51 | 66 | 2.71 | 9.94 | 12.65 |
| Design7 | −15.93 | 65 | 6.59 | 16.23 | 22.83 |
|  | −15.93 | 65 | 6.59 | 16.23 | 22.83 |
| Design8 | −33.41 | 60 | 4.46 | 7.83 | 12.30 |
|  | −33.41 | 60 | 4.46 | 7.83 | 12.30 |
| Design9 | −9.24 | 56 | 4.24 | 4.61 | 8.86 |
|  | −9.24 | 56 | 4.24 | 4.61 | 8.86 |
| Design10 | −12.11 | 54 | 3.96 | 2.17 | 6.14 |
|  | −12.11 | 54 | 3.96 | 2.17 | 6.14 |
| Design11 | −8.07 | 57 | 8.08 | 5.05 | 13.14 |
|  | −8.07 | 57 | 8.08 | 5.05 | 13.14 |
| Design12 | −11.89 | 69 | 20.78 | 3.58 | 24.37 |
|  | −11.89 | 69 | 20.78 | 3.58 | 24.37 |

As shown, several of the dynamic power dominated designs (e.g., Design1, Design2, Design3, Design6) show improvements in worst negative slack (WNS) level. Several designs illustrate reduction in area utilized (shown as a percentage of the macro) for the design. As TABLE A illustrates, aspects of the invention allow for improved performance in macros, by way of reduced WNS and/or reduced area utilized. The second six designs (Design7-Design12) represent those cases where the Vt levels of cells were not switched (as in process P4B of FIG. 1). In these cases, the approach described herein determined that the cells were not dynamic power dominated, and as such, did not switch those cells to low Vt levels.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

Figure 2:
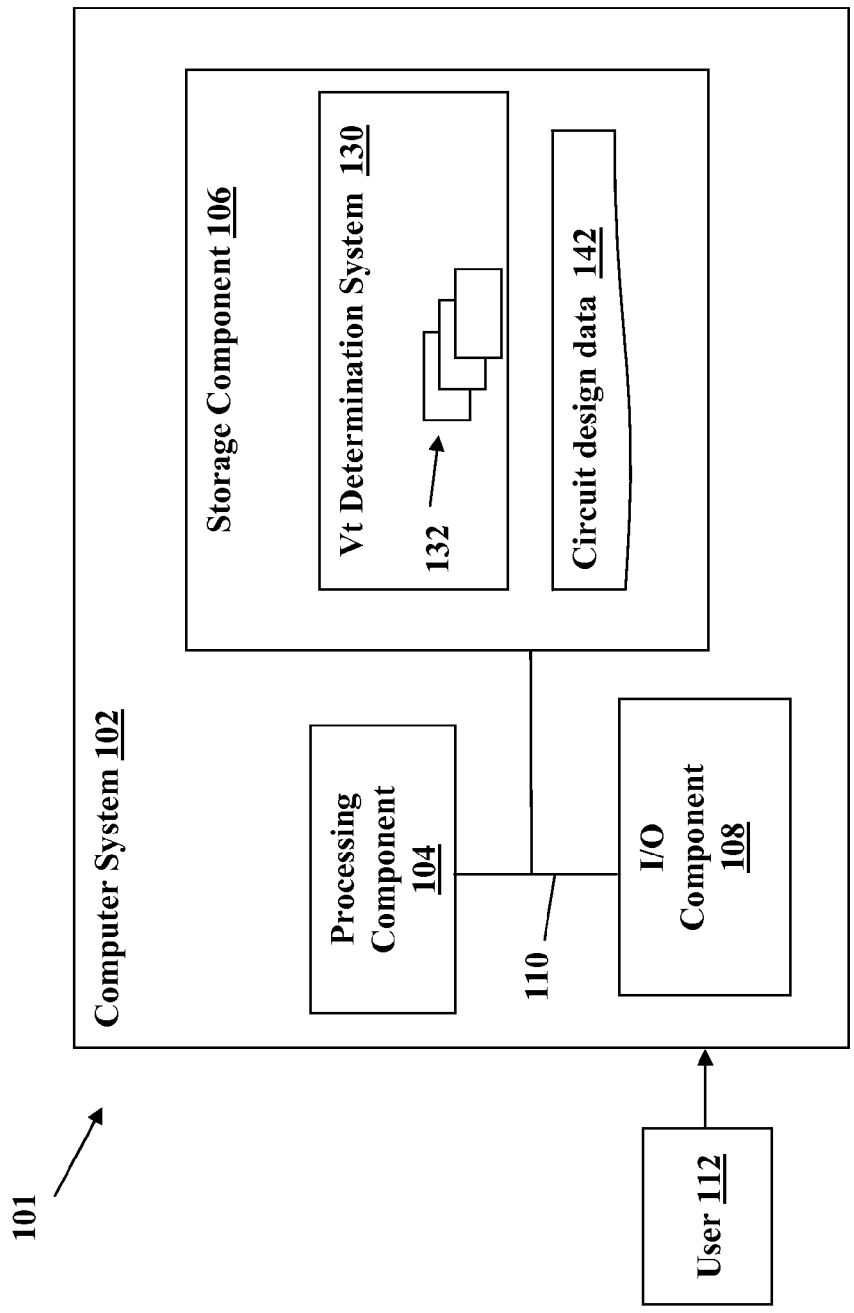
FIG. 2 shows an illustrative environment including a system according to embodiments of the invention.

FIG. 2 depicts an illustrative environment 101 for determining threshold voltages (Vts) in circuit cells according to embodiments. To this extent, the environment 101 includes a computer system 102 that can perform a process described herein in order to integrate manufacturing feedback into an integrated circuit structure design. In particular, the computer system 102 is shown as including a Vt determination system 130, which makes computer system 102 operable to determine a Vt level of components in an integrated circuit prior timing driven placement by performing any/all of the processes described herein and implementing any/all of the embodiments described herein.

The computer system 102 is shown including a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the Vt determination system 130, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a human user 112 to interact with the computer system 102 and/or one or more communications devices to enable a system user 112 to communicate with the computer system 102 using any type of communications link. To this extent, the Vt determination system 130 can manage a set of interfaces (e.g., graphical user interface(s), application program interface, etc.) that enable human and/or system users 112 to interact with the Vt determination system 130. Further, the Vt determination system 130 can manage (e.g., store, retrieve, create, manipulate, organize, present, etc.) data, such as circuit design data 142 using any solution.

In any event, the computer system 102 can comprise one or more general purpose computing articles of manufacture (e.g., computing devices) capable of executing program code, such as the Vt determination system 130, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the Vt determination system 130 can be embodied as any combination of system software and/or application software.

Further, the Vt determination system 130 can be implemented using a set of modules 132. In this case, a module 132 can enable the computer system 102 to perform a set of tasks used by the Vt determination system 130, and can be separately developed and/or implemented apart from other portions of the Vt determination system 130. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of Vt determination system 130 fixed thereon (e.g., one or more modules 132). However, it is understood that the computer system 102 and Vt determination system 130 are only representative of various possible equivalent computer systems that may perform a process described herein. To this extent, in other embodiments, the functionality provided by the computer system 102 and Vt determination system 130 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide data, such as circuit design data 142 using any solution. For example, the computer system 102 can generate and/or be used to circuit design data 142, retrieve circuit design data 142, from one or more data stores, receive circuit design data 142, from another system, send circuit design data 142 to another system, etc.

While shown and described herein as a method and system for modeling the fringe capacitance of components in an integrated circuit prior to the layout design phase, it is understood that aspects of the invention further provide various alternative embodiments. For example, in one embodiment, the invention provides a computer program fixed in at least one computer-readable medium, which when executed, enables a computer system to model the fringe capacitance of components in an integrated circuit prior to the layout design phase. To this extent, the computer-readable medium includes program code, such as the Vt determination system 130 (FIG. 2), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the Vt determination system 130 (FIG. 2), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for determining Vt levels in cells in a macro. In this case, a computer system, such as the computer system 102 (FIG. 2), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method of determining threshold voltage levels within a macro of integrated circuit cells, performed using at least one computing device, the method comprising:

referencing a library of the integrated circuit cells in the macro using the at least one computing device;

estimating a leakage power and a dynamic power for a first integrated circuit cell in the macro;

comparing the leakage power with the dynamic power;

switching the first integrated circuit cell to a low threshold voltage level in response to determining the dynamic power is greater than the leakage power by a predetermined factor; and updating the library with a voltage level of the first integrated circuit cell.

2. The computer-implemented method of claim 1, further comprising:
estimating a leakage power and a dynamic power for a second integrated circuit cell in the macro, the second integrated circuit cell being distinct from the first integrated circuit cell;
comparing the leakage power of the second integrated circuit cell with the dynamic power of the second integrated circuit cell;
switching the second integrated circuit cell to the low threshold voltage level in response to determining the dynamic power of the second integrated circuit cell is greater than the leakage power of the second integrated circuit cell by the predetermined factor; and
updating the library with a voltage level of the second integrated circuit cell.

3. The computer-implemented method of claim 1, further comprising performing an incremental synthesis process on each cell in the updated library.

4. The computer-implemented method of claim 1, further comprising switching all of the integrated circuit cells in the macro to a low threshold voltage level in response to determining the dynamic power is greater than the leakage power by the predetermined factor.

5. The computer-implemented method of claim 4, further comprising updating the library with the low threshold voltage levels of all the integrated circuit cells in the macro.

6. The computer-implemented method of claim 1, wherein the predetermined factor is equal to three.

7. The computer-implemented method of claim 6, further comprising:
maintaining an initial threshold voltage level of the first integrated circuit cell in response to determining the dynamic power is not greater than the leakage power by at least the predetermined factor.

8. The computer-implemented method of claim 6, further comprising:
maintaining an initial threshold voltage of the first integrated circuit cell in response to determining the dynamic power is greater than the leakage power and the dynamic power does not exceed the leakage power by the predetermined factor.

9. A system comprising:
at least one computing device for determining threshold voltage levels within a macro of integrated circuit cells by performing actions including:
referencing a library of the integrated circuit cells in the macro;
estimating a leakage power and a dynamic power for a first integrated circuit cell in the macro;
comparing the leakage power with the dynamic power;
switching the first integrated circuit cell to a low threshold voltage level in response to determining the dynamic power is greater than the leakage power by a predetermined factor; and
updating the library with a voltage level of the first integrated circuit cell.

10. The system of claim 9, the at least one computing device further configured to perform actions including:
estimating a leakage power and a dynamic power for a second integrated circuit cell in the macro, the second integrated circuit cell being distinct from the first integrated circuit cell;
comparing the leakage power of the second integrated circuit cell with the dynamic power of the second integrated circuit cell;
switching the second integrated circuit cell to the low threshold voltage level in response to determining the dynamic power of the second integrated circuit cell is greater than the leakage power of the second integrated circuit cell by the predetermined factor; and
updating the library with a voltage level of the second integrated circuit cell.

11. The system of claim 9, the at least one computing device further configured to perform an incremental synthesis process on each cell in the updated library.

12. The system of claim 9 the at least one computing device further configured to switch all of the integrated circuit cells in the macro to a low threshold voltage level in response to determining the dynamic power is greater than the leakage power by the predetermined factor.

13. The system of claim 12, the at least one computing device further configured to update the library with the low threshold voltage levels of all the integrated circuit cells in the macro.

14. The system of claim 9, wherein the predetermined factor is equal to three.

15. A computer program comprising program code embodied in at least one non-transitory computer-readable medium, which when executed, enables a computer system to determine threshold voltage levels within a macro of integrated circuit cells by performing actions comprising:
reference a library of the integrated circuit cells in the macro;
estimating a leakage power and a dynamic power for a first integrated circuit cell in the macro;
comparing the leakage power with the dynamic power;
switching the first integrated circuit cell to a low threshold voltage level in response to determining the dynamic power is greater than the leakage power by a predetermined factor; and
updating the library with a voltage level of the first integrated circuit cell.

16. The computer program of claim 15, the code further enabling the computer system to perform the following:
estimate a leakage power and a dynamic power for a second integrated circuit cell in the macro, the second integrated circuit cell being distinct from the first integrated circuit cell;
compare the leakage power of the second integrated circuit cell with the dynamic power of the second integrated circuit cell;
switch the second integrated circuit cell to the low threshold voltage level in response to determining the dynamic power of the second integrated circuit cell is greater than the leakage power of the second integrated circuit cell by the predetermined factor; and
update the library with a voltage level of the second integrated circuit cell.

17. The computer program of claim 15, the code further enabling the computer system to perform an incremental synthesis process on each cell in the updated library.

18. The computer program of claim 15, the code further enabling the computer system to switch all of the integrated circuit cells in the macro to a low threshold voltage level in response to determining the dynamic power is greater than the leakage power by the predetermined factor.

19. The computer program of claim 18, the code further enabling the computer system to update the library with the low threshold voltage levels of all the integrated circuit cells in the macro.

20. The computer program of claim 15, wherein the predetermined factor is equal to three.

* * * * *